United States Patent [19]

Laughlin et al.

[11] Patent Number: 4,812,302

[45] Date of Patent: Mar. 14, 1989

[54] PROCESS FOR PREPARING HIGH PURITY $MN_3O_4$

[75] Inventors: William C. Laughlin; Dwight A. Schulke, both of Edmond, Okla.

[73] Assignee: Kerr-McGee Chemical Corporation, Oklahoma City, Okla.

[21] Appl. No.: 61,961

[22] Filed: Jun. 15, 1987

[51] Int. Cl.$^4$ .............................................. C01G 45/02
[52] U.S. Cl. ....................................... 423/605; 423/50
[58] Field of Search ........................... 423/605, 599, 50

[56] References Cited

U.S. PATENT DOCUMENTS

| | | | |
|---|---|---|---|
| 3,715,764 | 2/1973 | Chu | 423/49 |
| 3,767,780 | 10/1973 | Bellas et al. | 423/605 |
| 4,137,291 | 1/1979 | Cardwell et al. | 423/DIG. 4 |
| 4,411,878 | 10/1983 | Welsh | 423/605 |

OTHER PUBLICATIONS

Chemistry, Bailar, Jr. et al., Academic Press, 1978, pp. 419-420.
A Comprehensive Treatise on Inorganic and Theoretical Chemistry, Mellor, Longmans, Green and Co., 1932, vol. XII, pp. 186-187, 231-232.
Kirk-Othmer Encyclopedia of Chemical Technology, 2nd ed., vol. 13, pp. 17-18.

*Primary Examiner*—John Doll
*Assistant Examiner*—Jeffrey Edwin Russel
*Attorney, Agent, or Firm*—William G. Addison; John P. Ward

[57] ABSTRACT

A process for the preparation of high purity manganous-manganic oxide ($Mn_3O_4$) is provided, wherein particulate manganese metal suspended in an aqueous solution containing a water soluble ammonium salt is oxidized in the presence of an oxidizing agent at a temperature of at least 30° C.

11 Claims, No Drawings

PROCESS FOR PREPARING HIGH PURITY MN₃O₄

FIELD OF THE INVENTION

The present invention relates to a process for the preparation of manganous-manganic oxide ($Mn_3O_4$). More particularly, the present invention relates to a process for preparing high purity manganous-manganic oxide by oxidation of particulate manganese metal.

BACKGROUND OF THE INVENTION

It is known that manganous-manganic oxide ($Mn_3O_4$) can readily be prepared by either reduction of a higher oxide of manganese such as manganese (III) oxide, a manganese (IV) oxides and MnOOH, or by oxidation of a lower oxide or hydroxide of manganese such as manganese (II) oxide and manganese (II) hydroxide. Representative examples of such known processes are those described in U.S. Pat. Nos. 4,411,878 and 3,767,780. In U.S. Pat. No. 4,411,878 there is disclosed a process for the preparation of manganous-manganic oxide comprising the reductive roasting of a higher oxide of manganese in the presence of a reducing gas, specifically methane. In accordance with the teachings of this patent, a higher oxide of manganese such as $MnO_2$, $Mn_2O_3$ or MnOOH, and the like, is heated in a kiln in the presence of an excess current of methane gas. Operating temperatures are limited to levels between 250° C. and 550° C. to prevent further reduction of the $Mn_3O_4$ product formed to manganese (II) oxide. The advantages of this process are asserted to be that it is simpler to carry out than alternate wet processes involving the precipitation of manganese (II) hydroxide and the subsequent oxidation of this hydroxide to the desired manganous-manganic oxide product. The process also is asserted to offer significant advantages over other dry reduction processes employing temperatures higher than 550° C. For example, higher temperature dry reduction processes result in the production of manganese (II) oxide which then must be reoxidized to the desired manganous-manganic oxide product. Also, the resulting manganous-manganic oxide product has a lower surface area and activity due to sintering.

U.S. Pat. No. 3,767,780 discloses a wet process for the preparation of manganous-manganic oxide comprising oxidation of an aqueous suspension of manganese (II) hydroxide at elevated temperatures and at superatmospheric pressures. In general, the operating temperatures and pressures employed in this patented process range from 100° C. to 140° C. and from 40 psi to 70 psi, respectively. The advantages of this process over other wet oxidation processes are asserted to be that reaction times are shorter, the manganous-manganic oxide product is more readily filtered and the product is less contaminated. In the main, these advantages can be and are attributable by the patentees to the use of superatmospheric pressures during the oxidation reaction.

SUMMARY OF THE INVENTION

The present invention provides an improved process for the preparation of manganous-manganic oxide ($Mn_3O_4$) and particularly to the preparation of highly pure $Mn_3O_4$. Unlike prior known processes which generally comprise the reduction of higher oxides of manganese or the oxidation of manganese (II) oxide or manganese (II) hydroxide the present process is characterized by the oxidation of particulate manganese metal.

Broadly, the present invention relates to a process for preparing highly pure manganous-manganic oxide ($Mn_3O_4$) wherein said process comprises heating, at a temperature of at least 30° C., an aqueous slurry comprises of a particulate manganese metal suspended in an aqueous solution containing a water soluble ammonium salt while introducing an oxidizing agent thereto. Heating is continued for a time sufficient to convert the suspended manganese metal to the desired manganous-manganic oxide product. The process further comprises subsequently subjecting the oxidized slurry to a separation step to recover from the slurry the manganous-manganic oxide product suspended therein.

DETAILED DESCRIPTION OF THE INVENTION

It now has been discovered that manganous-manganic oxide ($Mn_3O_4$) can be prepared both economically and efficiently through the oxidation of particulate manganese metal. The manganous-manganic oxide thus produces is readily filterable and possesses little or no contamination when compared to manganous-manganic oxide prepared from known processes such as those processes based upon the oxidation of manganese (II) hydroxide. The manganese metals useful in the practice of the present invention preferably comprise those commercially available high purity manganese metals produced electrolytically or by electric furnace reduction of manganese-bearing ores by silicon or aluminum. However, manganese alloys, such as the ferromanganese and silicomanganese alloys also may be employed in the practice of this invention to yield the desired manganous-manganic oxide product.

The manganese metal is employed in the form of fine, discrete particles of a size sufficient to pass through the openings of a 100 mesh (U.S. Series) filter screen. In general, the manganese metal is comminuated or ground to a particle size ranging from about 20 to about 149 microns in size. Comminution or grinding can be effected by any conventional and convenient means including batch and continuous tumbling mills such as the known ball, pebble, rod and tube mills and the like.

The ground particulate manganese metal is suspended in an aqueous solution containing a water soluble ammonium salt corresponding to the general formula $(NH_4)_nX$ where n is 1 or 2 and X is an anion selected from the group consisting of halogen, nitrate and sulfate ions. Representative, but nonlimiting examples of water soluble ammonium salts corresponding to the above formula and useful in the preparation of the aqueous solution in which the particulate manganese metal is suspended include ammonium chloride, ammonium bromide, ammonium iodide, ammonium nitrate and ammonium sulfate. Of these ammonium salts, ammonium chloride, ammonium nitrate and ammonium sulfate are the most preferred salts for use in the practice of the invention.

The aqueous solutions containing water soluble ammonium salts useful in the practice of the invention can be preformed solutions or they can be formed in situ by the addition of a water soluble ammonium salt to a slurry of the mangangese metal suspended in water. In either event, the ammonium salt will be present in the aqueous slurry in sufficient concentrations to provide the slurry with a pH ranging from about 6 to about 10. Depending upon the particular ammonium salt employed, an aqueous slurry having a pH within this range can readily be prepared by the use of ammonium salt concentrations ranging from about 0.1 to about 50 grams per liter of solution and preferably from about 1 to about 5 grams per liter of solution.

Whether preformed or formed in situ, the use of aqueous solutions containing water soluble ammonium salts as a suspending medium for the particulate manganese metal is critical to the practice of the present invention. This particularly is true if a reasonable rate of reaction and a readily filterable oxide product are to be obtained. For example, in comparative experimentation wherein distilled water alone was used as a suspending medium for the particulate manganese metal, the oxidation reaction proceeded at an extremely slow rate and the oxide product produced was not readily filterable. However, when aqueous solutions containing water soluble ammonium salts are used as the suspending medium reasonable rates of reaction and a readily filterable oxide product are obtained. It is not known how the water soluble ammonium salts function to produce the readily filterable manganousmanganic oxide product. However the ammonium salts function, the result always is a manganous-manganic oxide product, the individual particles of which are of a size sufficient to render the oxide product easily recoverable by conventional means such as filtration.

Once the aqueous slurry of the particulated manganese metal suspended in the aqueous solution containing the water soluble ammonium salt has been formed, an oxidizing agent then is introduced into the aqueous slurry and the slurry heated to a temperature sufficient to initiate and sustain the oxidation reaction. The oxidizing agent may be oxygen or any oxygen-containing gas such as air. The introduction of the oxidizing agent into the aqueous slurry and the heating of the aqueous slurry will be continued for a period of time sufficient to allow substantially complete oxidation of the particulate manganese metal to the desired manganous-manganic oxide product. Most usually, substantially complete oxidation is achieved with reaction times ranging from about 1 to about 4 hours at temperatures ranging from about 50° C. to about 100° C. Generally, a temperature of at least 30° C. is required to initiate and sustain the oxidation reaction.

Upon completion of the oxidation reaction, the manganousmanganic oxide product may be recovered by any conventional separation means. One economical and efficient means is by simple filtration. Following separation of the suspended manganous-manganic oxide product from the reacted aqueous slurry, the oxide product is washed free of any residual water soluble ammonium salt and then dried at temperatures ranging from about 100° C. to about 130° C. The washed and dried oxide product finds utility as a starting material for use in the manufacture of ferrites of the general formula $MFe_2O_4$ wherein M, in this instance, will be manganse.

The following nonlimiting examples are presented as being illustrative of the practice of the present invention and are not intended to limit, in any manner, the spirit and scope of the invention.

EXAMPLES 1-8

A series of oxidative experiments was carried out using the process of the present invention. In each experiment, an aqueous slurry was prepared comprised of 10.0 grams (g) of manganese metal suspended in 250 milliliters (ml) of water. To each of the aqueous slurries was added a water soluble ammonium salt in an amount ranging from 0.1 to 5.0 g. Each slurry containing the ammonium salt then was heated, while either air or oxygen was introduced continuously thereto. Heating of each slurry was continued for a period of time ranging from 2-5 hours. At the end of this time the slurries were filtered and the oxide products contained therein dried at a temperature of 100° C. Various data relating to this series of experiments are set forth in the Table below.

For comparative purposes, an additional oxidation experiment was carried out in the same manner as described above using the same quantities of materials and processing conditions with the exception that no water soluble ammonium salt was utilized. Data relating to this comparative experiment (Experiment A) also are set forth in the Table below.

TABLE

| Experiment No. | 1 | 2 | 3 | 4 | 5 | 6 | 7 | A |
|---|---|---|---|---|---|---|---|---|
| Manganese, g | 10.0 | 10.0 | 10.0 | 10.0 | 10.0 | 10.0 | 10.0 | 10.0 |
| Water, ml | 250 | 250 | 250 | 250 | 250 | 250 | 250 | 250 |
| Ammonium Salt, | $NH_4Cl$ | $NH_4Cl$ | $NH_4Cl$ | $NH_4Cl$ | $NH_4Cl$ | $NH_4NO_3$ | $(NH_4)_2SO_4$ | None |
| Weight, g | 1.0 | 0.1 | 1.0 | 5.0 | 1.0 | 2.0 | 3.0 | |
| Oxidant | Air | Air | Air | $O_2$ | $O_2$ | Air | Air | $O_2$ |
| Time, hr. | 2 | 2 | 5 | 2 | 2 | 2 | 2 | 2 |
| Temp., °C. | 100 | 80 | 30 | 100 | 100 | 80 | 80 | 100 |
| Product[a] | $Mn_3O_4$ | $Mn_3O_4$ | $Mn_3O_4$ | $Mn_3O_4$ | $Mn_3O_4$ | $Mn_3O_4$ | $Mn_3O_4$ | Mn |

[a]Determined by X-ray diffraction

As can be seen from the above Table, manganese metal can readily be oxidized to manganous-manganic oxide utilizing the process of the present invention. The oxide product can be produced using various water soluble ammonium salts and amounts thereof over a wide range of temperatures. As is evident from these data, the presence of the water soluble ammonium salt is most critical to the oxidation of the manganese metal to the desired oxide product.

While the invention has been described in detail with reference to preferred embodiments thereof, it is evident that many alternatives, modifications and variations will be apparent to those skilled in this art in light of the foregoing description. Accordingly, it is intended to embrace all such alternatives, modifications and variations that fall within the spirit and scope of the appended claims.

What is claimed is:

1. A process for preparing manganous-manganic oxide ($Mn_3O_4$) consisting of:
   forming an aqueous slurry of particulate manganese metal suspended in an aqueous solution containing a water soluble salt of ammonium;
   introducing an oxidizing agent into said aqueous slurry;

heating said aqueous slurry containing said oxidizing agent to a temperature of at least 30° C. for a period of time sufficient to oxidize said manganese metal; and recovering the manganous-manganic oxide product.

2. The process of claim 1 wherein the particulate manganese metal is of a particle size sufficient to pass through a 100 mesh filter screen.

3. The process of claim 1 wherein said aqueous slurry has a pH ranging from about 6 to about 9.

4. The process of claim 1 wherein said water soluble salt of ammonium is a salt of the formula $(NH_4)_nX$ where n is 1 or 2 and X is an anion selected from the group consisting of halogen, nitrate and sulfate ions.

5. The process of claim 1 wherein said oxidizing agent is selected from the group consisting of oxygen, and oxygen-containing gases.

6. A process for preparing manganous-manganic oxide ($Mn_3O_4$) consisting of:

forming an aqueous slurry of particulate manganese metal of a particle size sufficient to pass through a 100 mesh filter screen suspended in an aqueous solution containing a water soluble ammonium salt of the formula $(NH_4)_nX$ where n is 1 or 2 and X is an anion selected from the group consisting of halogen, nitrate and sulfate ions;

introducing an oxidizing agent selected from the group consisting of oxygen and oxygen-containing gases into said aqueous slurry;

heating said aqueous slurry containing said oxidizing agent to a temperature of at least 30° C. for a period of time sufficient to oxidize said manganese metal; and recovering the manganous-manganic oxide product.

7. The process of claim 6 wherein said aqueous slurry has a pH ranging from about 6 to about 10.

8. The process of claim 6 wherein said water soluble ammonium salt is present in said aqueous slurry in a concentration ranging from about 0.1 to about 50 grams per liter of solution.

9. The process of claim 8 wherein said concentration ranges from about 1 to about 5 grams per liter of solution.

10. The process of claim 6 wherein said water soluble ammonium salt is ammonium chloride.

11. The process of claim 6 wherein said aqueous slurry containing said oxidizing agent is heated to a temperature in the range of from about 30° C. to about 100° C.

* * * * *